(12) United States Patent
Matsuo

(10) Patent No.: US 9,904,807 B2
(45) Date of Patent: Feb. 27, 2018

(54) MEMORY SYSTEM AND INFORMATION PROCESSING SYSTEM

(71) Applicant: Toshiba Memory Corporation, Tokyo (JP)

(72) Inventor: Kiyotaka Matsuo, Fujisawa Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 231 days.

(21) Appl. No.: 14/835,201

(22) Filed: Aug. 25, 2015

(65) Prior Publication Data

US 2016/0203342 A1 Jul. 14, 2016

Related U.S. Application Data

(60) Provisional application No. 62/101,482, filed on Jan. 9, 2015.

(51) Int. Cl.
| | |
|---|---|
| *G06F 21/00* | (2013.01) |
| *G06F 21/79* | (2013.01) |
| *G06F 3/06* | (2006.01) |
| *G06F 12/02* | (2006.01) |
| G06F 11/30 | (2006.01) |
| G06F 12/14 | (2006.01) |

(52) U.S. Cl.
CPC ............ *G06F 21/79* (2013.01); *G06F 3/0623* (2013.01); *G06F 3/0656* (2013.01); *G06F 3/0679* (2013.01); *G06F 12/0246* (2013.01); G06F 2212/7203 (2013.01); G06F 2221/2107 (2013.01)

(58) Field of Classification Search
None
See application file for complete search history.

(56) References Cited

U.S. PATENT DOCUMENTS

| | | | |
|---|---|---|---|
| 8,181,024 B2 | 5/2012 | Nagai et al. | |
| 2002/0048364 A1* | 4/2002 | Gligor | H04L 9/0637 380/37 |
| 2004/0010612 A1 | 1/2004 | Pandya | |
| 2005/0105738 A1* | 5/2005 | Hashimoto | G06F 21/72 380/277 |
| 2006/0020941 A1* | 1/2006 | Inamura | G06F 21/6218 718/100 |

(Continued)

FOREIGN PATENT DOCUMENTS

JP 2003288012 A 10/2003

*Primary Examiner* — Eric Chen
(74) *Attorney, Agent, or Firm* — Patterson & Sheridan, LLP

(57) ABSTRACT

A memory system includes a controller configured to write data to a nonvolatile memory. The controller includes a buffer unit configured to hold write data including a plurality of pieces of unit data, a sequencer configured to receive the write data from the buffer unit and individually output the plurality of pieces of unit data sequentially, and a plurality of cores, each being configured to encrypt at least one of the pieces of unit data output from the sequencer. The buffer is further configured to output the plurality of pieces of unit data sequentially to the sequencer, such that a last piece of unit data is output consecutively after a preceding piece of unit data is output.

15 Claims, 11 Drawing Sheets

(56) References Cited

U.S. PATENT DOCUMENTS

| | | | |
|---|---|---|---|
| 2010/0128874 A1* | 5/2010 | Scott-Nash | G09C 1/00 380/255 |
| 2011/0255689 A1* | 10/2011 | Bolotov | H04L 9/0631 380/42 |
| 2013/0091237 A1* | 4/2013 | Arulambalam | H04L 65/60 709/213 |
| 2013/0142326 A1* | 6/2013 | Asnaashari | H04L 9/28 380/28 |
| 2015/0058639 A1* | 2/2015 | Hasegawa | G06F 21/85 713/190 |
| 2015/0067326 A1* | 3/2015 | Lee | G06F 21/6218 713/165 |
| 2015/0156174 A1* | 6/2015 | Fahey | H04L 63/0428 713/168 |

\* cited by examiner

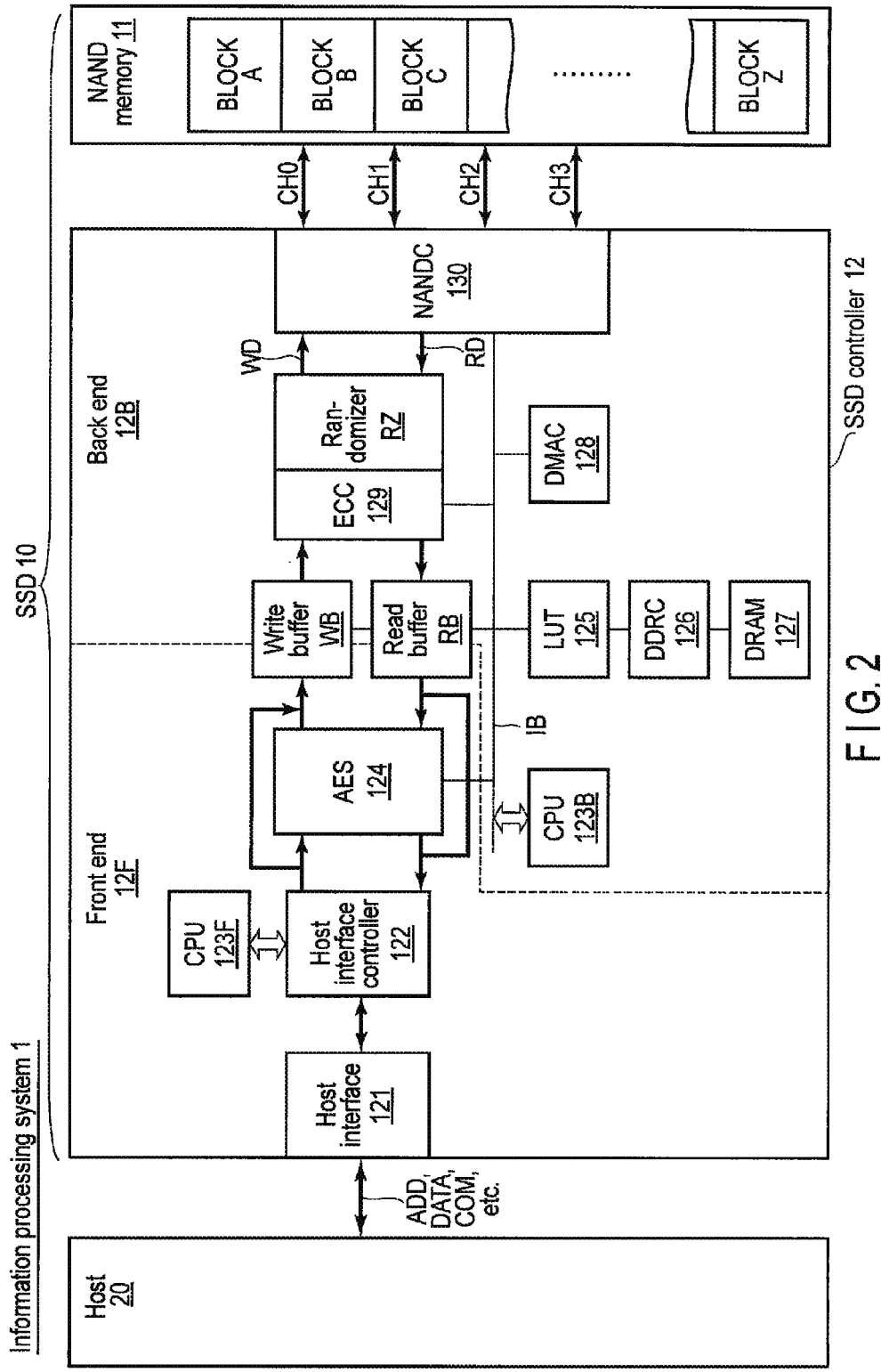
F I G. 2

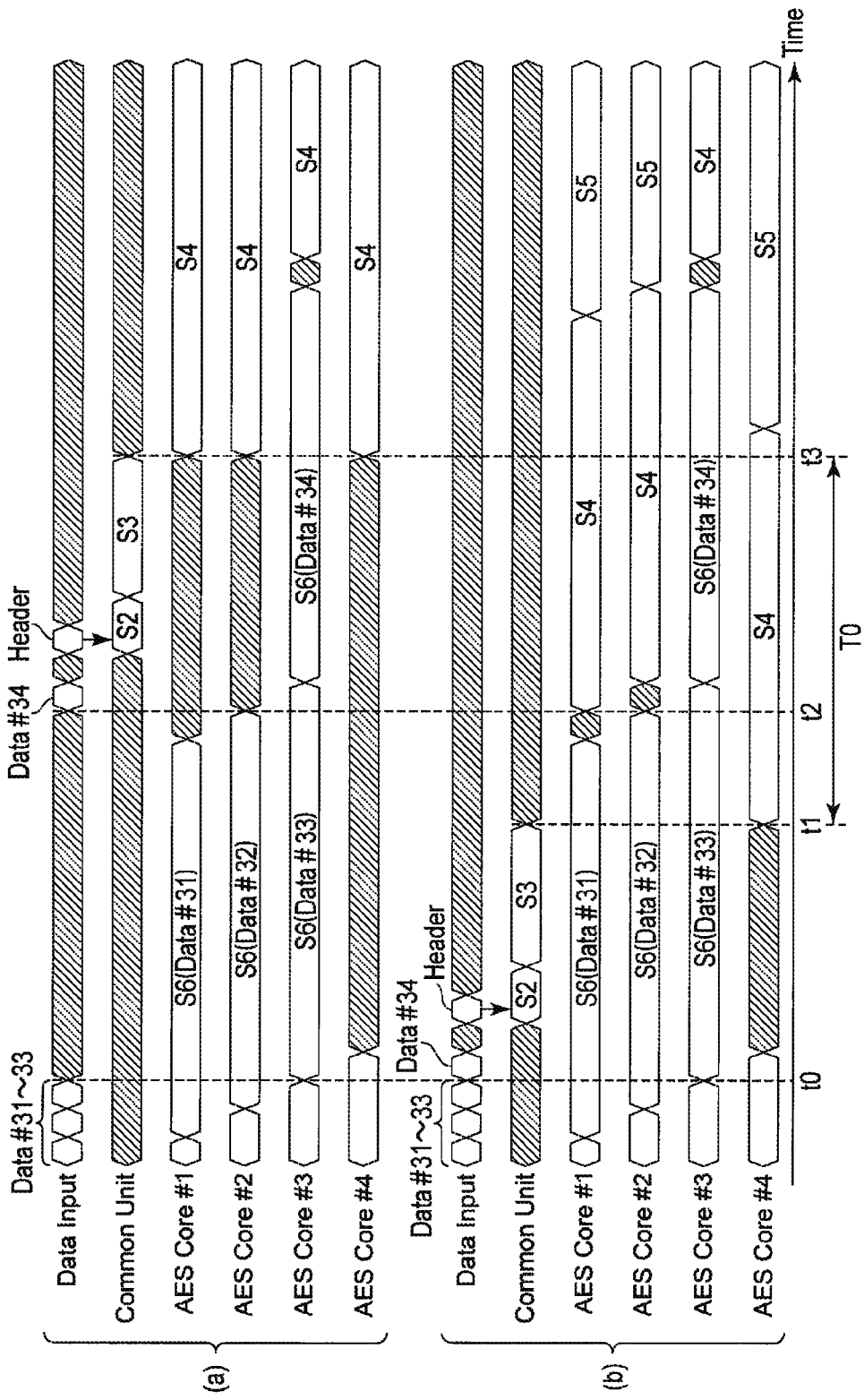

FIG. 7A

(a) Sector 0

| | 1st Series | 2nd Series | 3rd Series | 4th Series | 5th Series |
|---|---|---|---|---|---|
| Core #1 | Sct#0-Data#01 | Sct#0-Data#11 | Sct#0-Data#21 | Sct#0-Data#31 | |
| Core #2 | Sct#0-Data#02 | Sct#0-Data#12 | Sct#0-Data#22 | Sct#0-Data#32 | |
| Core #3 | Sct#0-Data#03 | Sct#0-Data#13 | Sct#0-Data#23 | Sct#0-Data#33 | |
| Core #4 | Sct#0-Data#04 | Sct#0-Data#14 | Sct#0-Data#24 | | Sct#0-Data#34 |
| Core #5 | Sct#0-Data#05 | Sct#0-Data#15 | Sct#0-Data#25 | | |
| Core #6 | Sct#0-Data#06 | Sct#0-Data#16 | Sct#0-Data#26 | | |
| Core #7 | Sct#0-Data#07 | Sct#0-Data#17 | Sct#0-Data#27 | | |
| Core #8 | Sct#0-Data#08 | Sct#0-Data#18 | Sct#0-Data#28 | | |
| Core #9 | Sct#0-Data#09 | Sct#0-Data#19 | Sct#0-Data#29 | | |
| Core #10 | Sct#0-Data#10 | Sct#0-Data#20 | Sct#0-Data#30 | | |

Sector 1

| | 6th Series | 7th Series |
|---|---|---|
| Core #1 | Sct#1-Data#01 | Sct#1-Data#11 |
| Core #2 | Sct#1-Data#02 | Sct#1-Data#12 |
| Core #3 | Sct#1-Data#03 | Sct#1-Data#13 |
| Core #4 | Sct#1-Data#04 | Sct#1-Data#14 |
| Core #5 | Sct#1-Data#05 | Sct#1-Data#15 |
| Core #6 | Sct#1-Data#06 | Sct#1-Data#16 |
| Core #7 | Sct#1-Data#07 | Sct#1-Data#17 |
| Core #8 | Sct#1-Data#08 | Sct#1-Data#18 |
| Core #9 | Sct#1-Data#09 | Sct#1-Data#19 |
| Core #10 | Sct#1-Data#10 | Sct#1-Data#20 |

(b) Sector 0

| | 1st Series | 2nd Series | 3rd Series | 4th Series | 5th Series |
|---|---|---|---|---|---|
| Core #1 | Sct#0-Data#01 | Sct#0-Data#11 | Sct#0-Data#21 | Sct#0-Data#31 | |
| Core #2 | Sct#0-Data#02 | Sct#0-Data#12 | Sct#0-Data#22 | Sct#0-Data#32 | |
| Core #3 | Sct#0-Data#03 | Sct#0-Data#13 | Sct#0-Data#23 | Sct#0-Data#33 | |
| Core #4 | Sct#0-Data#04 | Sct#0-Data#14 | Sct#0-Data#24 | | Sct#0-Data#34 |
| Core #5 | Sct#0-Data#05 | Sct#0-Data#15 | Sct#0-Data#25 | | |
| Core #6 | Sct#0-Data#06 | Sct#0-Data#16 | Sct#0-Data#26 | | |
| Core #7 | Sct#0-Data#07 | Sct#0-Data#17 | Sct#0-Data#27 | | |
| Core #8 | Sct#0-Data#08 | Sct#0-Data#18 | Sct#0-Data#28 | | |
| Core #9 | Sct#0-Data#09 | Sct#0-Data#19 | Sct#0-Data#29 | | |
| Core #10 | Sct#0-Data#10 | Sct#0-Data#20 | Sct#0-Data#30 | | |

Sector 1

| | 6th Series | 7th Series |
|---|---|---|
| Core #1 | | Sct#1-Data#08 |
| Core #2 | | Sct#1-Data#09 |
| Core #3 | | Sct#1-Data#10 |
| Core #4 | Sct#1-Data#01 | Sct#1-Data#11 |
| Core #5 | Sct#1-Data#02 | Sct#1-Data#12 |
| Core #6 | Sct#1-Data#03 | Sct#1-Data#13 |
| Core #7 | Sct#1-Data#04 | Sct#1-Data#14 |
| Core #8 | Sct#1-Data#05 | Sct#1-Data#15 |
| Core #9 | Sct#1-Data#06 | Sct#1-Data#16 |
| Core #10 | Sct#1-Data#07 | Sct#1-Data#17 |

FIG. 7B (a)

| | 8th Series | 9th Series | 10th Series | 11th Series | 12th Series |
|---|---|---|---|---|---|
| Core #1 | Sct#1-Data#21 | Sct#1-Data#31 | | Sct#2-Data#01 | Sct#2-Data#11 |
| Core #2 | Sct#1-Data#22 | Sct#1-Data#32 | | Sct#2-Data#02 | Sct#2-Data#12 |
| Core #3 | Sct#1-Data#23 | Sct#1-Data#33 | | Sct#2-Data#03 | Sct#2-Data#13 |
| Core #4 | Sct#1-Data#24 | | Sct#1-Data#34 | Sct#2-Data#04 | Sct#2-Data#14 |
| Core #5 | Sct#1-Data#25 | | | Sct#2-Data#05 | Sct#2-Data#15 |
| Core #6 | Sct#1-Data#26 | | | Sct#2-Data#06 | Sct#2-Data#16 |
| Core #7 | Sct#1-Data#27 | | | Sct#2-Data#07 | Sct#2-Data#17 |
| Core #8 | Sct#1-Data#28 | | | Sct#2-Data#08 | Sct#2-Data#18 |
| Core #9 | Sct#1-Data#29 | | | Sct#2-Data#09 | Sct#2-Data#19 |
| Core #10 | Sct#1-Data#30 | | | Sct#2-Data#10 | Sct#2-Data#20 |

Sector 1 / Sector 2

(b)

| | 8th Series | 9th Series | 10th Series | 11th Series | 12th Series |
|---|---|---|---|---|---|
| Core #1 | Sct#1-Data#18 | Sct#1-Data#28 | | | Sct#2-Data#05 |
| Core #2 | Sct#1-Data#19 | Sct#1-Data#29 | | | Sct#2-Data#06 |
| Core #3 | Sct#1-Data#20 | Sct#1-Data#30 | | | Sct#2-Data#07 |
| Core #4 | Sct#1-Data#21 | Sct#1-Data#31 | | | Sct#2-Data#08 |
| Core #5 | Sct#1-Data#22 | Sct#1-Data#32 | | | Sct#2-Data#09 |
| Core #6 | Sct#1-Data#23 | Sct#1-Data#33 | | | Sct#2-Data#10 |
| Core #7 | Sct#1-Data#24 | | Sct#1-Data#34 | Sct#2-Data#01 | Sct#2-Data#11 |
| Core #8 | Sct#1-Data#25 | | | Sct#2-Data#02 | Sct#2-Data#12 |
| Core #9 | Sct#1-Data#26 | | | Sct#2-Data#03 | Sct#2-Data#13 |
| Core #10 | Sct#1-Data#27 | | | Sct#2-Data#04 | Sct#2-Data#14 |

MEMORY SYSTEM AND INFORMATION PROCESSING SYSTEM

CROSS-REFERENCE TO RELATED APPLICATION

This application is based upon and claims the benefit of priority from the U.S. Provisional Application No. 62/101,482, filed Jan. 9, 2015, the entire contents of which are incorporated herein by reference.

FIELD

Embodiments relate generally to a memory system and an information processing system.

BACKGROUND

One type of a memory system includes a nonvolatile semiconductor memory, such as a solid-state drive (SSD) as a storage medium, instead of a magnetic memory, such as a hard disk drive (HDD). Such a memory system may have an interface similar to that of a memory system including the hard disk drive (HDD).

BRIEF DESCRIPTION OF THE DRAWINGS

FIG. 2 is a block diagram showing a detailed structure of a memory system according to the first embodiment.

FIG. 6 is a timing chart of a data transfer operation according to a comparative example (a) and a data transfer operation according to the first embodiment (b).

FIGS. 7A and 7B each illustrate an order of outputting data to each of AES cores of the AES unit, with respect to the comparative example (a) and the first embodiment (b).

DETAILED DESCRIPTION

Figure 1:
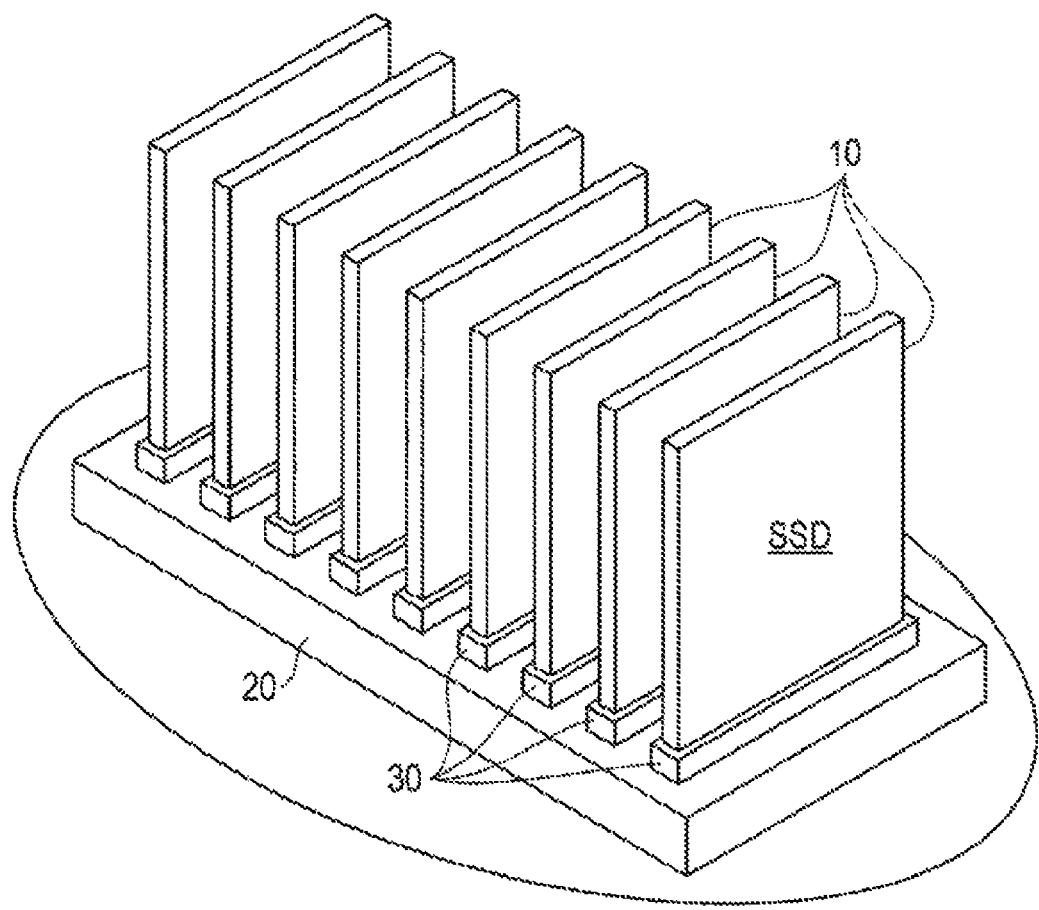
FIG. 1 is a perspective view of an information processing system according to a first embodiment.

Various embodiments will be described hereinafter with reference to the accompanying drawings.

The embodiments will be described by referring to the drawings. In the descriptions given below, the same reference numbers are assigned to substantially the same functions or elements, and explanation of them are given as necessary. Also, in the present specification, several examples of expression are provided for some of the elements. These examples of expression are presented by way of example only, and do not deny the possibility of the elements to be expressed by other wording. Further, different wording may be used for elements which are not phrased in more than one way.

In general, according to one embodiment, a memory system includes a controller configured to write data to a nonvolatile memory. The controller includes a buffer unit configured to hold write data including a plurality of pieces of unit data, a sequencer configured to receive the write data from the buffer unit and individually output the plurality of pieces of unit data sequentially, and a plurality of cores, each being configured to encrypt at least one the pieces of unit data output from the sequencer. The buffer is further configured to output the plurality of pieces of unit data sequentially to the sequencer, such that a last piece of unit data is output consecutively after a preceding piece of unit data is output.

First Embodiment

[1. Structure]

[1-1 Overall Structure (Information Processing System)]

Referring to FIG. 1, an information processing system 1 including a memory system 10 according to a first embodiment will be described. As shown in FIG. 1, the information processing system 1 according to the first embodiment includes the memory system 10 and a host 20 which controls the memory system 10. Here, as the memory system 10, an SSD will be described as an example.

As shown in FIG. 1, the outside appearance of the SSD 10, which is a memory system of the first embodiment, is a relatively small module. A dimension of the SSD 10 is, for example, 20 mm×30 mm or so. However, the size or dimension of the SSD 10 is not limited to the above, and may be changed variously as required.

Further, the SSD 10 can be mounted in the host 20 such as a server to be used in a data center or a cloud computing system, etc., operated in a company (enterprise). Accordingly, the SSD 10 may be an enterprise SSD (an eSSD).

The host (host device) 20 comprises, for example, a plurality of connectors (for example, slots) 30 which open upward. Each connector 30 is, for example, a Serial Attached SCSI (SAS) connector. The SAS connector enables the host 20 and each SSD 10 to perform high-speed communication with each other by means of a 6-Gbps dual port. However, the connector 30 is not limited to the above, and may be PCI express (PCIe) or NVM express (NVMe).

Further, the SSDs 10 are mounted on the connectors 30 of the host 20, respectively, and supported in the upright positions (i.e., standing substantially vertically) next to each other. Such an arrangement enables a plurality of SSDs 10 to be compactly mounted all together, and to reduce the size of the host 20. The shape of each of the SSDs 10 is a 2.5-inch small form factor (SFF). By virtue of the above SFF shape, the SSD 10 can be compatible with an enterprise HDD (eHDD) in shape. Accordingly, the SSD 10 can achieve easy system compatibility with the eHDD.

Here, the SSD 10 is not limited to ones for enterprises. For example, the SSD 10 is applicable as a storage medium of consumer electronic apparatuses such as a notebook portable computer and a tablet device.

[1-2. Memory System]

Next, referring to FIG. 2, detailed configuration of the memory system 10 according to the first embodiment will be described.

As shown in FIG. 2, the memory system (SSD) 10 according to the first embodiment includes a NAND-type flash memory (hereinafter NAND memory) 11 and an SSD controller 12 which controls the NAND memory 11.

The NAND memory 11 (a storage unit) is a nonvolatile semiconductor memory which stores predetermined data on the basis of control of the SSD controller 12 via four channels (CH0 to CH3). The NAND memory 11 includes a plurality of physical blocks (block A to block Z). Details of the physical blocks will be described below.

The SSD controller (controller, memory controller) 12 controls the NAND memory 11 on the basis of requests (such as write/read command COM) transmitted from the host 20, logical address LBA, and data, etc. The SSD controller 12 includes a front end 12F and a back end 12B.

[Front End 12F]

The front end (host interface portion) 12F receives a predetermined command (a write command, a read command, etc.) transmitted from the host 20, logical address LBA, and data, and analyzes the predetermined command. Further, the front end 12F requests the back end 12B to read or write user data, on the basis of a result of analysis of the command.

The front end 12F includes a host interface 121, a host interface controller 122, an encryption/decryption unit 124, and a CPU 123F.

The host interface 121 communicates requests (a write command, a read command, an erasure command, etc.), logical address LBA, and data, etc. with the host 20.

The host interface controller (control unit) 122 controls the communication of the host interface 121, on the basis of control of the CPU 123F.

An advanced encryption standard (AES) unit (encryption/decryption unit) 124 encrypts write data (plaintext) transmitted from the host interface controller 122 during a data write operation. The AES unit 124 decrypts encrypted read data transmitted from a read buffer RB of the back end 12B during a data read operation. Here, the write data and the read data can be transmitted without being processed by the AES unit 124 as needed. Detailed structure and operation of the AES unit 124 will be described below.

The CPU 123F controls each of the above-described constituent elements of the front end 12F (121 to 124), and controls overall operation of the front end 12F.

[Back End 12B]

The back end (memory interface portion) 12B performs a predetermined garbage collection on the basis of a data write request from the front end 12F and the operational state, etc., of the NAND memory 11, and writes user data transmitted from the host 20 to the NAND memory 11. Also, the back end 12B reads the user data from the NAND memory 11 on the basis of the data read request. Further, the back end 12B erases the user data from the NAND memory 11 on the basis of the data erasure request.

The back end 12B comprises a write buffer WB, the read buffer RB, an LUT unit 125, a DDRC 126, a DRAM 127, a DMAC 128, an ECC 129, randomizer RZ, a NANDC 130, and a CPU 123B.

The write buffer (write data transfer unit) WB temporarily stores write data WD transmitted from the host 20. Specifically, the write buffer WB temporarily stores the aforementioned write data WD until it reaches a predetermined data size suitable for the NAND memory 11. For example, the write buffer WB temporarily stores the write data WD until it reaches 16 KB, which corresponds to a page size. That is, when a page is constituted of four clusters, the write buffer WB temporarily stores the write data WD until it reaches the data size of four clusters (i.e., 4 KB×4=16 KB).

The read buffer (read data transfer unit) RB temporarily stores read data RD which has been read from the NAND memory 11. More specifically, in the read buffer RB, the read data RD is rearranged such that it is in the order convenient for the host 20 (i.e., the order of logical address LBA specified by the host 20).

The LUT unit (the look-up table unit or translating unit) 125 uses a predetermined translation table (not shown) and translates a logical address LBA transmitted from the host 20 into a predetermined physical address PBA. Details of the LUT unit 125 will be described below.

The DDRC 126 controls the double data rate (DDR) in the DRAM 127.

The dynamic random access memory (DRAM) 127 is used, for example, as a work area for storing the translation table of the LUT unit 125, and is a volatile semiconductor memory which stores predetermined data.

The DMAC 128 transfers the write data WD or the read data RD, etc., via an internal bus IB. Although only one DMAC 128 is provided in the present embodiment, the number of DMACs is not limited to one. The DMAC 128 may be arranged in various places within the SSD controller 12 as needed.

The ECC (error correction unit) 129 adds an error-correcting code (ECC) to the write data WD transmitted from the write buffer WB. The ECC 129 uses the added ECC and corrects the read data RD which has been read from the NAND memory 11 as necessary before the ECC 129 transmits the read data RD to the read buffer RB.

The randomizer (scrambler) RZ disperses the write data WD so that the write data WD is not concentrated in a specific page or in a specific word line, etc., of the NAND memory 11 during the data write operation. By dispersing the write data WD in this way, the write frequency can be more uniform, and the life of memory cells MC of the NAND memory 11 can be extended. Thus, the reliability of the NAND memory 11 can be increased. Further, the read data RD which has been read from the NAND memory 11 passes through the randomizer RZ during the data read operation.

The NANDC (data write/read unit) 130 accesses the NAND memory 11 in parallel using a plurality of channels (in this instance, four channels CH0 to CH3) in order to meet a predetermined speed requirement.

The CPU 123B controls each of the above-described constituent elements of the back end 12B (125 to 130), and controls overall operation of the back end 12B.

Here, the configuration of the memory system 10 shown in FIG. 2 is an example, and the configuration of the memory system 10 is not limited to one that is shown.

[1-3. Physical Block]

Figure 3:
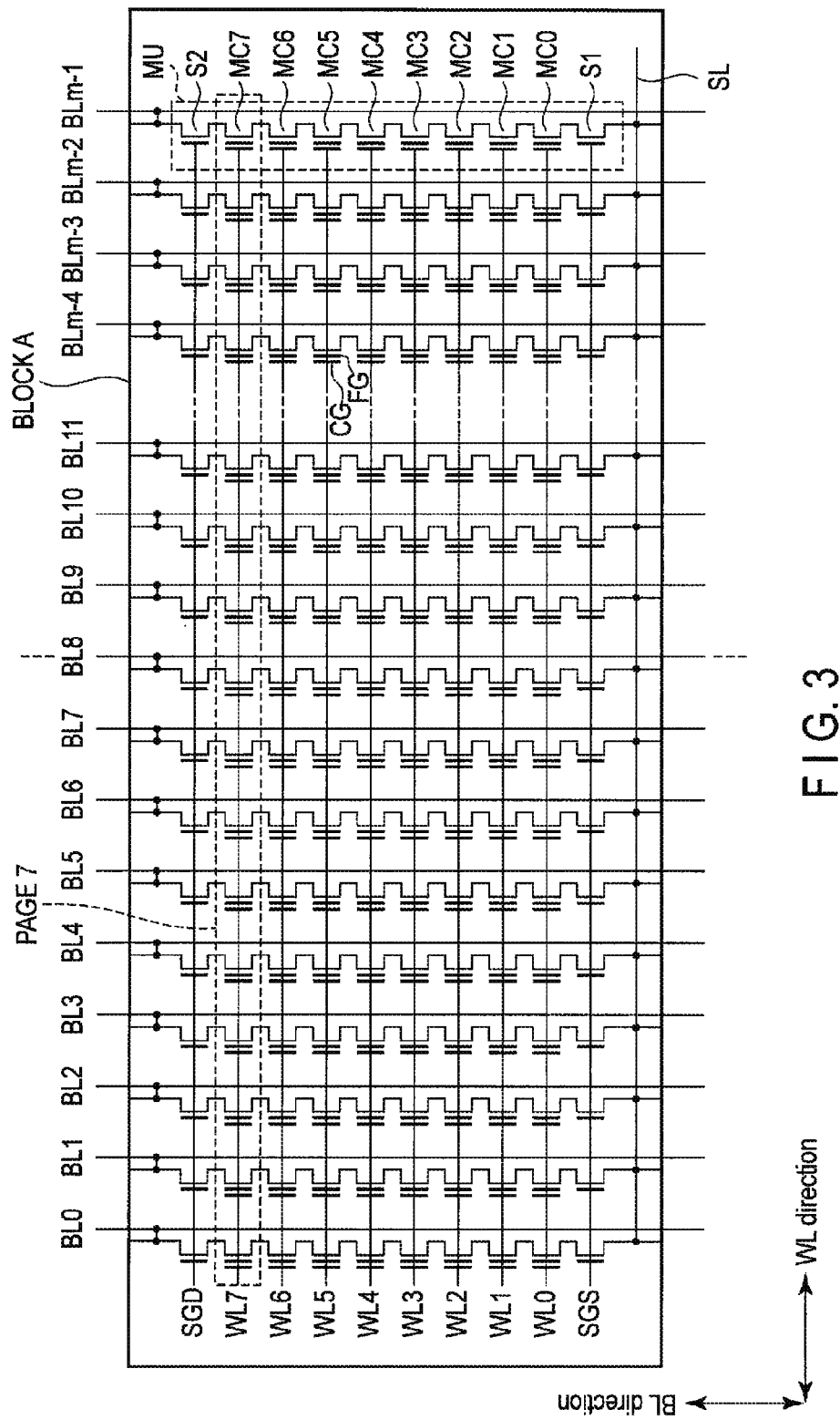
FIG. 3 is a circuit diagram showing block A of a NAND memory in FIG. 2.

Referring to FIG. 3, a circuit configuration of a physical block included in the NAND memory 11 of FIG. 2 will be described. Here, a physical block A is given as an example.

The physical block A includes a plurality of memory cell units MU arranged along the direction of word lines (WL direction). Each memory cell unit MU has a NAND string (a memory cell string) including eight memory cells MC0 to MC7 which extend along the direction of bit lines (i.e., BL direction) intersecting the word lines and of which current pathways are connected in series, the source-side select transistor S1 connected to one end of a current pathway of the NAND string, and the drain-side select transistor S2 connected to the other end of the current pathway of the NAND string. Each of the memory cells MC0 to MC7 has a control gate CG and a floating gate FG. Although the memory cell unit MU in the present embodiment includes eight memory cells MC0 to MC7, the number of memory cells in a single memory cell unit MU is not limited to eight. A memory cell unit MU may include two or more memory cells, for example, 56 or 32 memory cells.

The other ends of the current pathways of the source-side select transistors S1 are connected to a source line SL in common. The other ends of the current pathways of the drain-side select transistors S2 are connected to bit lines BL0 to BLm−1, respectively.

Each of the word lines WL0 to WL7 is connected in common to control gates CG of memory cells arranged in the WL direction. A selector gate line SGS is connected in common to gate electrodes of the select transistors S1 arranged in the WL direction. A selector gate line SGD is similarly connected in common to gate electrodes of the select transistors S2 arranged in the WL direction.

As shown in FIG. 3, a page (PAGE) is formed in each word line WL0 to WL7. For example, page 7 (PAGE 7) is formed in the word line WL7 as indicated by the area surrounded by a broken line in FIG. 3. The data read and write operations are performed for each of these pages (PAGEs). Therefore, a page (PAGE) is a unit of data read and data write. Data erase is performed at a time with respect to the entire physical block A. Accordingly, a physical block is a unit of data erasure.

[1-4. AES Unit]

Figure 4:
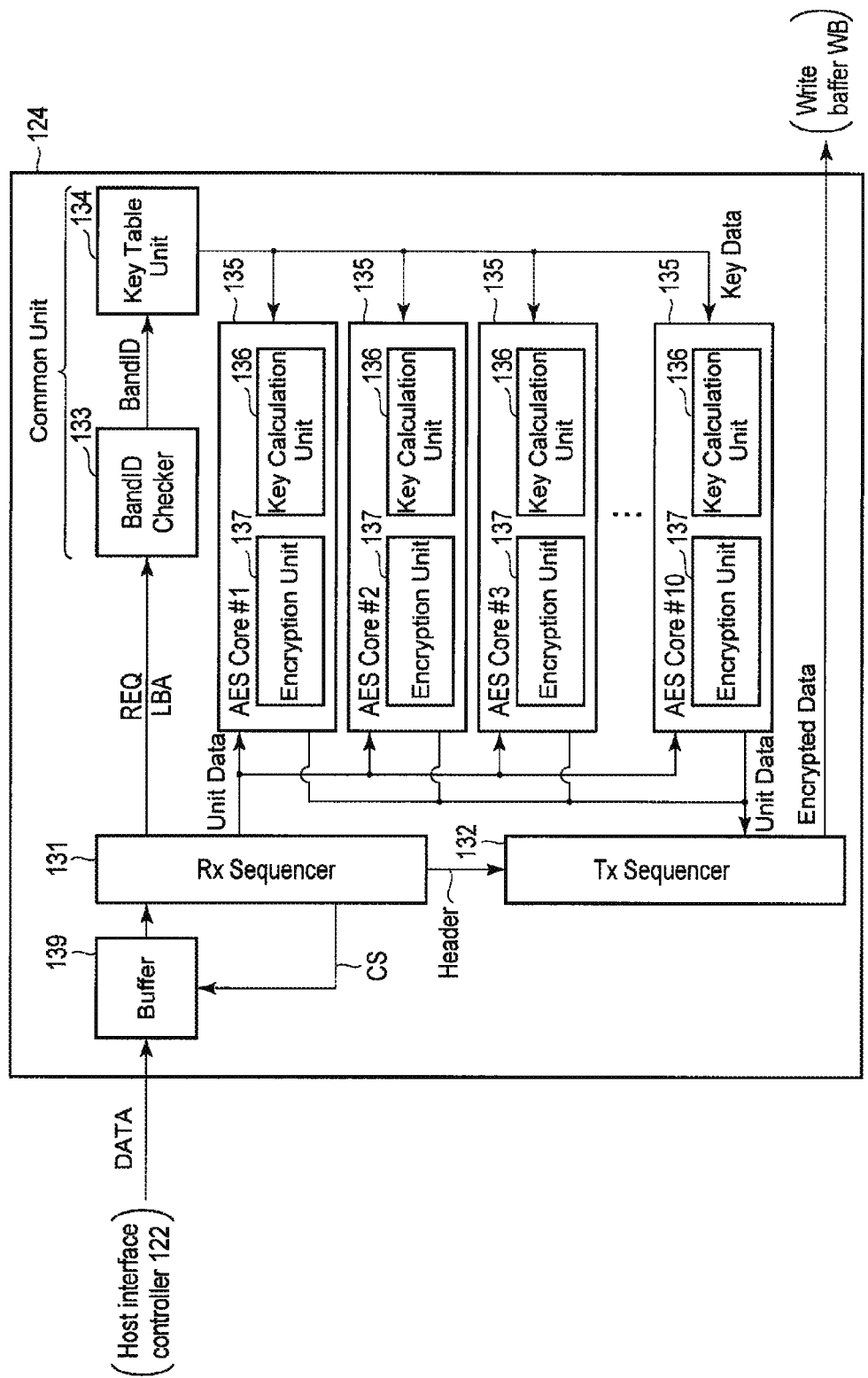
FIG. 4 is a block diagram showing an advanced encryption standard (AES)_ unit in the memory system according to the first embodiment.

Referring to FIG. 4, detailed configuration of the AES unit 124 according to the first embodiment will be described. Here, a multicore structure including ten AES cores 135 (AES core #1 to AES core #10) will be described as an example. Also, in FIG. 4, the relationship between input and output of each item of data during the data write operation is shown.

As shown in FIG. 4, the AES unit 124 includes a receiving-side sequencer 131, a transmitting-side sequencer 132, a band ID checker 133, a key table unit 134, a plurality of AES cores 135, and a buffer 139.

Here, the "core" refers to a complex of a calculation unit which performs calculation for encryption or decryption of unit data (S6) and a control unit (excluding a sequencer which manages the unit data allocation) configured to control the encryption and decryption. As an example, each of the AES cores 135 in the present embodiment includes a key calculation (expansion) unit 136 and an encryption unit 137. Here, in each of the AES cores 135, a calculation unit and a control unit for decryption are omitted. However, as a matter of course, the configuration of each of the AES cores 135 is not limited to the one shown in FIG. 4.

The processing in each of the AES cores 135 usually takes a predetermined length of time according to a size of an encryption key. In order to reduce the time required for processing in the AES cores 135 as much as possible, the receiving-side sequencer (first sequencer) 131 divides the input data read from the buffer 139 into a plurality of items of unit data, and allocates the items of unit data to different AES cores 135, respectively. The "unit data" refers to data having a size that enables the data to be transferred by clock signal CK of a predetermined transfer cycle (for example, one transfer cycle).

The transmitting-side sequencer (second sequencer) 132 collects encrypted unit data output from each of the AES cores 135, and sequentially transmits the collected encrypted unit data to the write buffer WB as the output data.

In the buffer 139, data is stored in such a way that a header is assigned to each item of data in units of sectors (sector data [first data]), which corresponds to a page (writing or reading unit). The size of the sector data is greater than that of the unit data, and is smaller than that of cluster data. The header includes the LBA indicating the head address of the position where the sector data is to be stored. The buffer 139 latches input data #34, which is the unit data, after the input data #34 has been received and the input data #34 is input to AES core #3. In other words, the buffer 139 holds the input data such that the last input data #34 in the sector and the input data #33 which precedes the last input data are consecutively received, in accordance with a control signal CS transmitted from the receiving-side sequencer 131. Here, the receiving-side sequencer 131 retrieves address information LBA included in the header when the header is read from the buffer 139. Further, the receiving-side sequencer 131 inputs band ID search request REQ together with the retrieved address information LBA, to the band ID checker 133.

The band ID checker 133 searches for a band ID in response to the band ID search request REQ, and outputs the searched band ID. The band ID refers to information which is used as a search key for the key table unit 134 to search for an encryption key. Here, it is assumed that address space is divided into a plurality of sections, and band IDs which are different for each of the sections are set in advance in the band ID checker 133. That is, the band ID checker 133 determines which section the address information included in the band ID search request REQ belongs to, and inputs the band ID corresponding to the determined section in the key table unit 134.

The key table unit (search unit) 134 stores the encryption key (key data) for each of the band IDs in advance. The key table unit 134 searches for the encryption key using the band ID input from the band ID checker 133 as the search key, and inputs the searched encryption key to each of the AES cores 135.

In each of the AES cores 135, the key calculation unit 136 executes expansion of the encryption key input from the key table unit 134. The key calculation unit 136 inputs the expanded encryption key (an expansion key) to the encryption unit 137.

The encryption unit (core encryption unit) 137 uses the expansion key input from the key calculation unit 136 to encrypt an initialization vector. The initialization vector is set in the encryption unit 137 in advance. Further, the encryption unit 137 encrypts the input data for each item of unit data that is input from the receiving-side sequencer 131, using the encrypted initialization vector. The encrypted unit data is collected by the transmitting-side sequencer 132, and transmitted to the write buffer WB as the output data.

[2. Data Transfer Operation]

Figure 5:
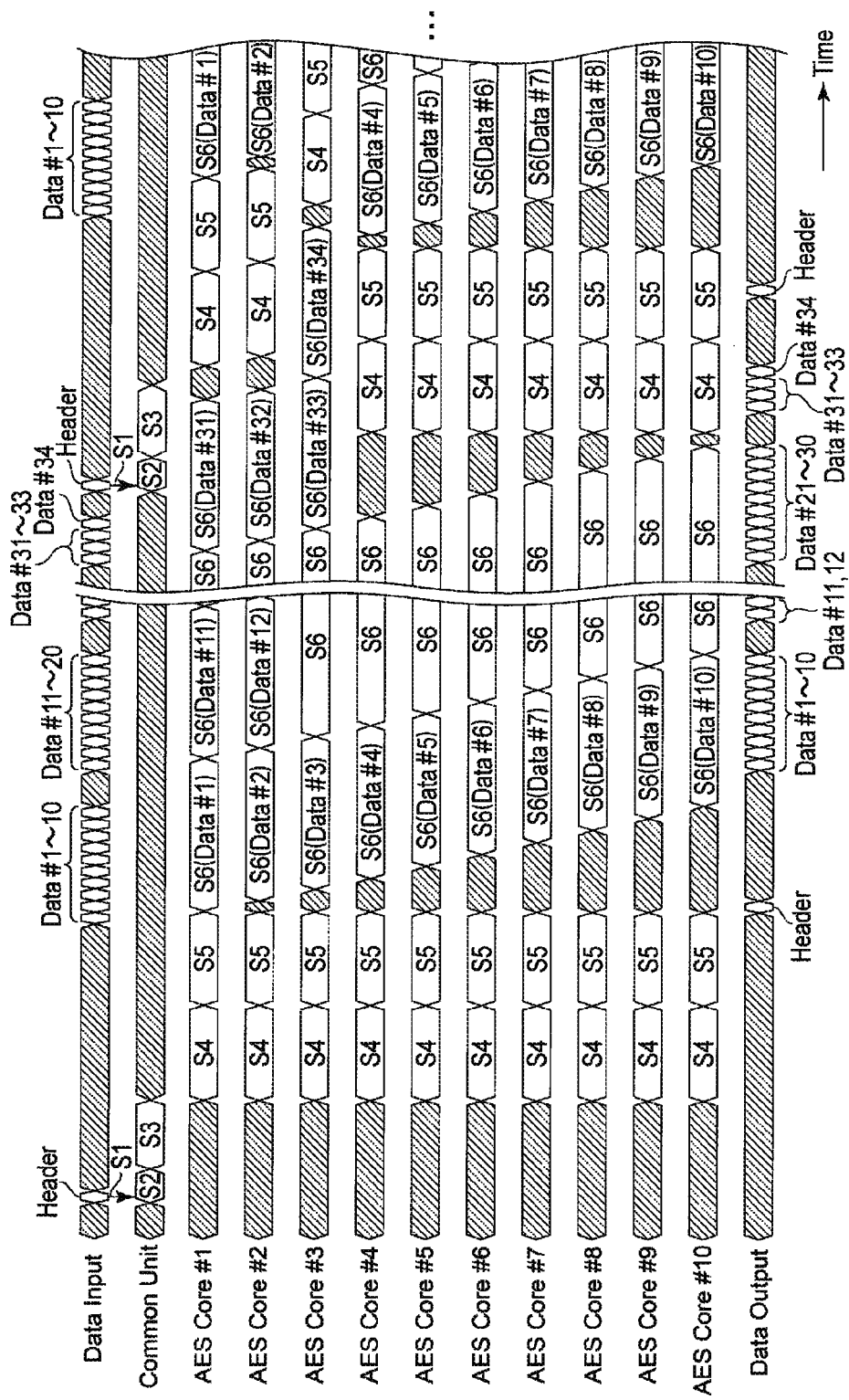
FIG. 5 is a timing chart showing a data transfer operation carried out by the AES unit.

Next, referring to FIG. 5, a data transfer operation carried out by the AES unit 124 according to the first embodiment will be described. FIG. 5 is a timing chart of the data transfer operation by the AES unit 124 of the first embodiment. Here, the clock CK is omitted.

In FIG. 5, each of shaded areas represents an idle state. The uppermost stream of the timing chart represents the data input operation of the receiving-side sequencer 131 during which the receiving-side sequencer 131 receives data from the buffer 139. The second stream from the top of the timing chart represents the operation of a common unit. The common unit refers to the band ID checker 133 and the key table unit 134. The third to twelfth streams from the top of the timing chart represent the operation of each of the AES cores 135. The lowermost stream of the timing chart represents the operation of the transmitting-side sequencer 132 during which the transmitting-side sequencer 132 outputs the data to the write buffer WB.

Here, items of unit data, which constitute the sector data, are distinguished from each other by using numbers such as data #1, data #2, etc. In the example shown in FIG. 5, the first sector data is constituted of a header and data #1 to data #34, each of which is the unit data.

As shown in FIG. 5, the receiving-side sequencer 131 receives the header of the first sector data from the buffer 139, and inputs the band ID search request REQ to the band ID checker 133 (S1). The band ID checker 133 searches for the band ID and inputs the searched band ID to the key table unit 134 (S2). The key table unit 134 searches for the encryption key (key data) corresponding to the input band ID, and inputs the searched encryption key to AES cores #1 to #10 (S3).

In each of AES cores #1 to #10, the key calculation unit 136 executes the expansion of the input encryption key (S4). The encryption unit 137 uses the executed expansion key to encrypt the initialization vector (S5).

Since the encryption key is input to AES cores #1 to #10 simultaneously, the process of S5 terminates simultaneously in AES cores #1 to #10. The receiving-side sequencer 131 receives data #1 from the buffer 139 before the process of S5 terminates in AES core #1. Further, when the process of S5 terminates in AES core #1, the receiving-side sequencer 131 inputs data #1 to AES core #1. The receiving-side sequencer 131 receives data #2 from the buffer 139 simultaneously with inputting data #1 to AES core #1. Further, after data #1 has been input to AES core #1, the receiving-side sequencer 131 receives data #3 from the buffer 139 simultaneously with inputting data #2 to AES core #2. In this way, the receiving-side sequencer 131 sequentially receives the unit data one by one, and also sequentially allocates the received items of unit data individually to the AES cores 135.

After completion of the process of S5, each of the AES cores 135 is in a standby state until the unit data is input. When the unit data is input, each of the AES cores 135 encrypts the input unit data using the initialization vector which has been encrypted in the process of S5 (S6). For example, AES core #1 encrypts the input unit data (data #1) using the encrypted initialization vector (S6 [data #1]). Since the unit data is input in the order of AES core #1, AES core #2, AES core #3, . . . , the encryption of the unit data is completed in the order of AES core #1, AES core #2, AES core #3, and so on.

At the timing of initiating the process of S6 in AES core #1, the header is input to the transmitting-side sequencer 132 from the receiving-side sequencer 131. The transmitting-side sequencer 132 outputs the input header as it is to the write buffer WB. Further, the transmitting-side sequencer 132 acquires each item of the encrypted unit data from the AES cores 135, and sequentially outputs the acquired encrypted unit data items to the write buffer WB as the output data.

At the timing when the receiving-side sequencer 131 finishes receiving data #1 to data #10, AES cores #1 to #10 are executing the process of S6. AES cores #1 to #10 complete the process of S6 in the order in which the unit data is input. When AES core #1 completes the process of S6, the receiving-side sequencer 131 inputs, to AES core #1, data #11, which is the unit data that comes after data #10. After that, the receiving-side sequencer 131 inputs data #12 to #20 to AES core #2 to #10. In each of the AES cores 135, the process of S6 is similarly performed for the input unit data, and the transmitting-side sequencer 132 collects the unit data for which the encryption is completed and outputs the collected unit data to the write buffer WB sequentially.

[Restriction on AES Method]

Here, as cyclic redundancy checking (CRC) is added to the last unit data (data #34) in the sector data, the encryption/decryption according to the AES method is subjected to a predetermined restriction. The last unit data refers to the unit data (Data #34) which is positioned at the end in the sector data.

The predetermined restriction is that when the size of the last unit data (data #34 [first unit data]) is smaller than a prescribed size (for example, the size [128 bits] enabling the data transfer by clock signal CK of one cycle), the unit data (data #33 [second unit data]) which is encrypted immediately before the last unit data and the last unit data must be input to the same AES core 135 (i.e., AES core #3). Here, since Data #3 is encrypted in AES core #3, when the size of data #34 is smaller than the prescribed size (128 bits), data #34 is input to AES core #3. Accordingly, in this case, the receiving-side sequencer 131 must wait until the encryption of data #33 is completed in AES core #3. That is, the receiving-side sequencer 131 must wait until the encryption of data #33 is completed in AES core #3, and input data #34 to AES core #3 after completion of the encryption of data #33. This restriction largely affects the latency which occurs from the input to output of data in the AES unit 124.

Hence, the buffer 139 of the AES unit 124 according to the first embodiment holds the input data such that the last input data (data #34) in the sector and the input data (data #33) which precedes the last data are consecutively input to the receiving-side sequencer 131, in accordance with control signal CS transmitted from the receiving-side sequencer 131. Accordingly, in the above restriction, the AES unit 124 of the first embodiment does not need to wait until the encryption of data #33 in AES core #3 is completed, and can transmit the last input data (data #34) consecutively with the input data (data #33) which precedes the last data. The above feature can reduce the latency.

Next, the receiving-side sequencer 131 receives a header of the following sector data after acquisition of the entire unit data has been completed for one-sector data, and before the encryption of the acquired entire data is completed. That is, in the example of FIG. 5, the receiving-side sequencer 131 receives a header of the subsequent sector data after data #34 has been received and before the encryption of data #34 is completed. In this way, in the common unit, the process of S2 for the next sector data can be started before the encryption of data #34 is completed. Also, in the common unit, as soon as the process of S2 is completed, the process of S3 can be started. As can be seen, at least a part of the latency for waiting for completion of the encryption of data #34 can be concealed by the processing performed for the next sector.

In the example of FIG. 5, the receiving-side sequencer 131 is shifted to an idle state after data #34 has been acquired. However, the receiving-side sequencer 131 may acquire a header of the next sector data without shifting to the idle state after receiving data #34.

The AES unit 124 thereafter similarly repeats the data transfer operation. Further, in FIG. 5, although the data transfer operation in the data write operation (i.e., encryption operation) is illustrated as an example, a data transfer operation in the data read operation (i.e., decryption operation) is substantially the same. Thus, a detailed description of the decryption operation is omitted.

[3. Effect and Advantage]

As described above, according to the configuration and the operation of the memory system 10 of the first embodiment, at least advantages (1) and (2) can be obtained.

(1) Latency Reduction and Communication Speed Increase

Referring to FIG. 6, a detailed description will be provided below based on a comparison between a comparative example and the first embodiment. FIG. 6 is a timing chart showing the data transfer operation, and a) represents the comparative example and b) represents the first embodiment.

Here, there is a tendency that the data transfer rate of an SSD required by the host side initiator increases year by year. This tendency also applies to a self-encrypting drive (SED) in which data is encrypted/decrypted according to the AES method in the AES unit. In encrypting/decrypting data according to the AES method, latency from the input to the output of data may become longer because computing time is required. Consequently, as compared to a non-SED, it is more difficult for the SED to transfer data at high speed. For example, a customer demand for a model which requires an AES function such as crypto-erase is increasing. As can be seen, in order to increase the data rate in the SSD, reducing the latency which occurs in an AES unit is absolutely necessary.

a) Comparative Example

In the comparative example, by forming the AES unit to be a multicore unit and causing each unit to operate in parallel, the communication behavior is speeded up as compared to a single-core structure. However, the AES unit of the comparative example is not provided with the buffer (storage unit) 139 of the AES unit 124 of the first embodiment.

Accordingly, at time t0 of FIG. 6(a), if the above restriction of the AES method is imposed, since the input data (data #34 and #33) must be input to the same AES core #3, the receiving-side sequencer of the comparative example does not receive data #34 until the encryption of data #33 is completed.

That is, at time t2 after the time of a predetermined idle state has elapsed, the receiving-side sequencer according to the comparative example must wait until the encryption of data #33 is completed in AES core #3, and then receive data #34, which is the last received data, in AES core #3 upon completion of encrypting data #33.

Further, since reception of data #34 is delayed, reception of the head data (data #1) of the next sector is delayed and the start of S4 (expansion) and S5 (IV encryption) is also delayed, which increases the latency. For example, in the comparative example, S4 is started at time t3.

As can be seen, since the latency from the input to output of data is large in the AES unit according to the comparative example, the AES unit of the comparative example is unfavorable in increasing the communication speed. Note that in the case of the comparative example, encryption/decryption per sector requires at least one hundred cycles or more.

Also, it is theoretically possible to reduce the latency simply by increasing the number of AES cores. However, practically, the increase in the number of cores directly leads to a drastic increase in the size of a circuit.

b) First Embodiment

In contrast, the AES unit 124 according to the first embodiment comprises at least the buffer 139 which holds the input data such that the last input data (data #34) in the sector and the input data (data #33) which precedes the last data are consecutively input to the receiving-side sequencer 131, in accordance with control signal CS transmitted from the receiving-side sequencer 131.

Accordingly, as shown in FIG. 6(b), at time to, when the above restriction is imposed, the AES unit 124 of the first embodiment does not need to wait until the encryption of data #33 in AES core #3 is completed, and receives the last input data (data #34) consecutively with the input data (data #33). As a result, in the first embodiment, receipt of the head data (data #1) of the next sector and the start of S4 (expansion) and S5 (IV encryption) can be expedited. For example, as shown in FIG. 6(b), in the first embodiment, S4 can be started in AES core #1 at time t2 which is earlier than the time in the comparative example.

In addition, the AES unit 124 according to the first embodiment has the sequencers 131 and 132 separately for the receiving side (Rx) and the transmitting side (Tx), respectively. The above structure enables a header to be transmitted from the receiving-side sequencer 131 to the transmitting-side sequencer 132. For example, as shown in FIG. 6(b), after time to, a header of the next sector is transmitted from the receiving-side sequencer 131 to the transmitting-side sequencer 132. In this way, separately from the encryption/decryption of data #34 in the precedent sector in AES core #3, it is possible to receive the header of the next sector and complete the process from S2 (band ID checking) to S3 (loading of an encryption key). As can be seen, according to the first embodiment, data #34 is encrypted/decrypted in AES core #3, but the common unit has already returned to the idle state at that time. Accordingly, the common unit can receive a header and start a part of encryption/decryption of the next sector.

As described above, the first embodiment is advantageous in that latency is reduced and the communication speed can be increased by expediting receipt of data of the next sector. For example, as shown in FIG. 6, the AES unit 124 according to the first embodiment can expedite the data reception by time T0 as compared to the data reception of the comparative example, and increase the communication speed.

Here, "consecutive" means that there is no gap such as an idle state or substantially no gap between the last input data (the first unit data: data #34) and the input data which precedes the last data (the second unit data: data #33). Further, "substantially no gap" includes the case where even if there is a timing gap between the last input data (the first unit data) and the input data which precedes the last data (the second unit data), this gap is shorter than that of the comparative example. As shown in FIG. 6, if the gap such as the idle state is shorter than that of the comparative example, the advantage of reducing the latency and increasing the communication speed can be obtained. For example, in the case shown in FIG. 6, when the gap between data #33 and #34 in the conventional example is fourteen cycles, and the gap of the first embodiment is shorter than that even by one cycle, the definition "substantially no gap" applies.

(2) Prevention of Increase in Circuit Size According to Increase in Number of AES Cores 135

Here, in the multicore structure, in order to reduce the latency, the number of the AES cores 135 may be further increased simply. However, as the number of the AES cores 135 increases, the size of a circuit increases drastically. With respect to this point, the number of the AES cores 135 of the first embodiment is ten, which is the same as the number of the comparative example. Accordingly, the first embodiment is advantageous in that the above described merit can be obtained without increasing the circuit size.

Here, the occupation area of the buffer 139 is sufficiently small as compared to that of each of the AES cores 135.

Second Embodiment [Example of Changing Order of Allocating Received Data to AES Cores]

Next, referring to FIGS. 7A, 7B, and 8, an information processing system 1 including a memory system 10 according to a second embodiment will be described. The second embodiment relates to an example of changing the order of allocating received data to AES cores. In the following, a detailed description of a portion which overlaps the first embodiment will be omitted.

[Configuration]

Although illustration is not provided, a receiving-side sequencer 131 and a transmitting-side sequencer 132 according to the second embodiment each comprises a counter which counts the number of items of received data (unit data), which is the transfer data (#1 to #34). Further, the receiving-side sequencer 131 and the transmitting-side sequencer 132 transmit predetermined control signals to their respective counters, and control the counters so that the numbers counted by the counters are not cleared (erased) for each transfer cycle of the transfer data. In other words, in accordance with the control of the receiving-side sequencer 131, the counter of the receiving-side sequencer 131 is counted continuously so that encryption is performed by the consecutive number of cores before and after the transfer cycle of the transfer data.

Since the other structures are substantially the same as those of the first embodiment, detailed descriptions of them are omitted.

[Order of Data Arrangement in Each AES Core]

According to the above structure, the order of arranging data in each of AES cores #1 to #10 is as indicated in FIG. 7A (b) and FIG. 7B (b), for example.

In the second embodiment, the receiving-side sequencer 131 and the transmitting-side sequencer 132 perform the control so that the numbers counted by their respective counters are not cleared (erased) for each cycle (each sector) of the transfer data. Accordingly, in the fifth turn in FIG. 7A (b), even if the data transfer of the last unit data (data #34) in sector 0, which corresponds to the first cycle, in core #3 is finished, the number counted by the counter is not cleared (erased). Accordingly, in the following sixth turn, encryption of the head unit data (data #1) in sector 1, which corresponds to the next second cycle, is performed in core #4 which succeeds core #3. The above structure applies to the eleventh turn in FIG. 7B (b), i.e., the head data in sector 2 corresponding to the third cycle.

In contrast, in a comparative example, a structure of the second embodiment is not provided. Accordingly, in the fifth turn of FIG. 7A (a), when data transfer of the last unit data (data #34) in sector 0, which corresponds to the first cycle, in core #3 is finished, the number counted by the counter is cleared (erased). Accordingly, in the following sixth turn, encryption of the head unit data (data #1) in sector 1, which corresponds to the next second cycle, is performed in the first core #1, because the number has been cleared in core #3. The above structure applies to the eleventh turn in FIG. 7B (a), i.e., the head data in sector 2 corresponding to the third cycle. As can be seen, in the comparative example, before and after the output of the preceding sector data and the input of the next sector data, the head unit data of the next sector is always input to AES core #1, and data #33 and data #34 when it is less than 128 bits in the precedent sector are always input to AES core #3.

[Data Transfer Operation]

Next, referring to FIG. 8, a data transfer operation of an AES unit 124 according to the second embodiment will be described.

Figure 8:
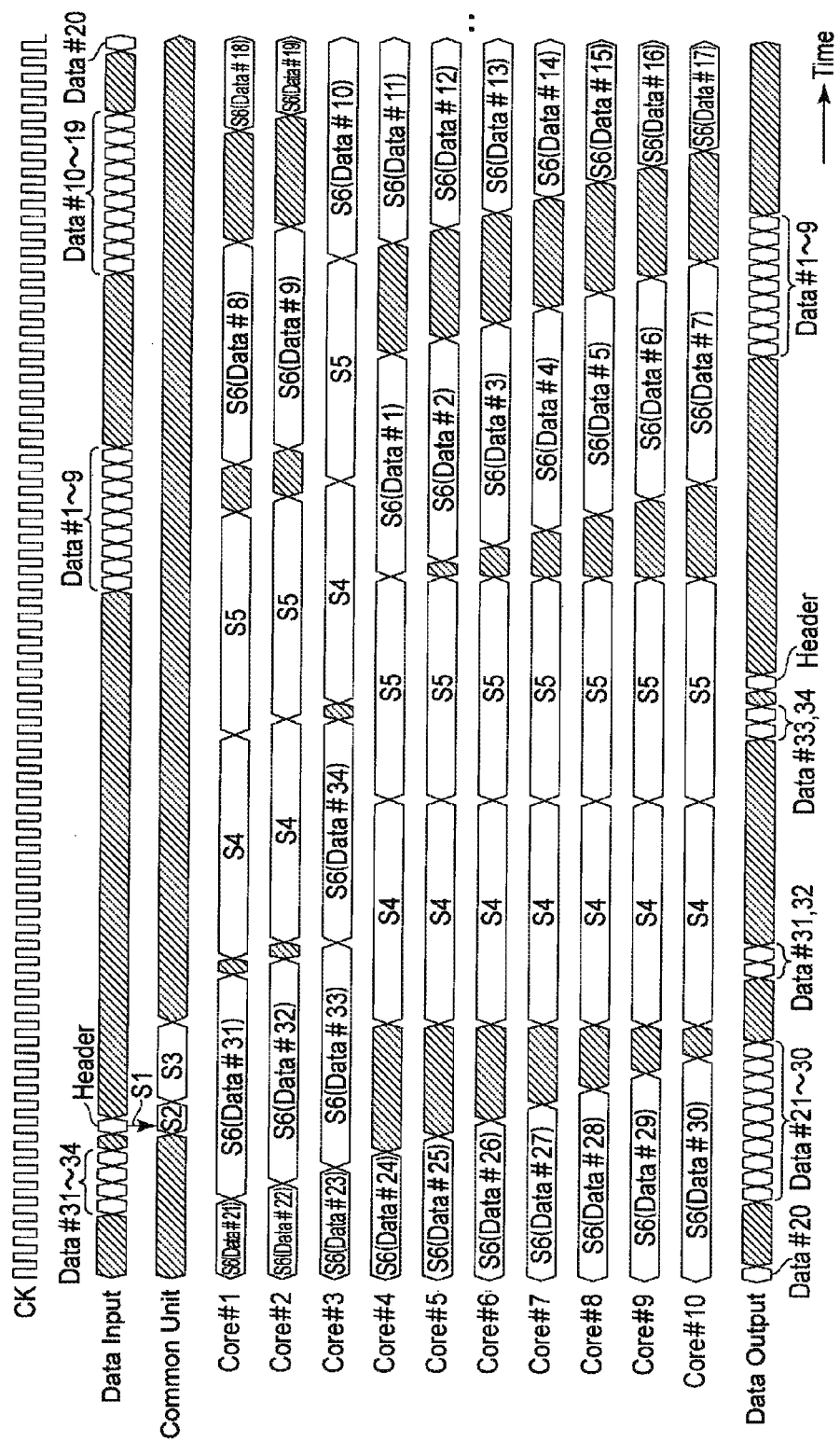
FIG. 8 is a timing chart of a data transfer operation of an AES unit in a memory system according to a second embodiment.

As shown in FIG. 8, the data transfer operation according to the second embodiment is different from that of the first embodiment in that encryption S6 of the head unit data of the next sector 1 (i.e., data #1) is sequentially executed from the AES core (#4), which succeeds the AES core (core #3) in which encryption S6 of the last unit data in the first sector 0 (i.e., data #34) is executed.

By the above feature, before S4 (key expansion) and S5 (IV encryption) of the AES core (core #3) in which the last unit data (data #34) is input is completed, data to be encrypted/decrypted in the first turn of the next sector 1 (i.e., data #1 to #9) can be input to all of the other AES cores (cores #4 to #10, and #1 to #2). As a result, the latency can be further reduced.

[Effect and Advantage]

As described above, according to the structure and the operation of the AES unit 124 of the second embodiment, at least advantages similar to the above advantages (1) and (2) can be obtained.

Further, the receiving-side sequencer 131 and the transmitting-side sequencer 132 according to the second embodiment each have a counter which counts the number of items of received data (unit data) (#1 to #34). The receiving-side sequencer 131 and the transmitting-side sequencer 132 transmit predetermined control signals to their respective counters, and control the counters so that the numbers counted by the counters are not cleared (erased) for each cycle of the transfer data. In other words, control is performed so that the head unit data (data #1) of the following sector 1 is input to core #4, which is the next succeeding core to AES core #3 in which the last unit data (#33 or #34) of the preceding sector 0 is input (FIG. 7A(b), FIG. 7B(b), and FIG. 8).

In this way, by changing the order of allocating data to each of AES cores 135, the present embodiment is advantageous in further reducing the latency and further increasing the communication speed. For example, by applying the second embodiment and the first embodiment described above, the time required for encryption/decryption per sector can be reduced to that corresponding to eighty eight cycles or so. This corresponds to reducing the number of cycles by ten cycles (10%) or more as compared to the case of the comparative example.

Third Embodiment [Example in which Dedicated Core for Performing S4 and S5 is Provided]

Next, referring to FIGS. 9 and 10, an information processing system 1 including a memory system 10 according to a third embodiment will be described. The third embodiment relates to an example in which a dedicated core for performing S4 (key expansion) and S5 (IV encryption) is provided. In the following, a detailed description of a portion which overlaps the first and the second embodiments will be omitted.

[Configuration]

Figure 9:
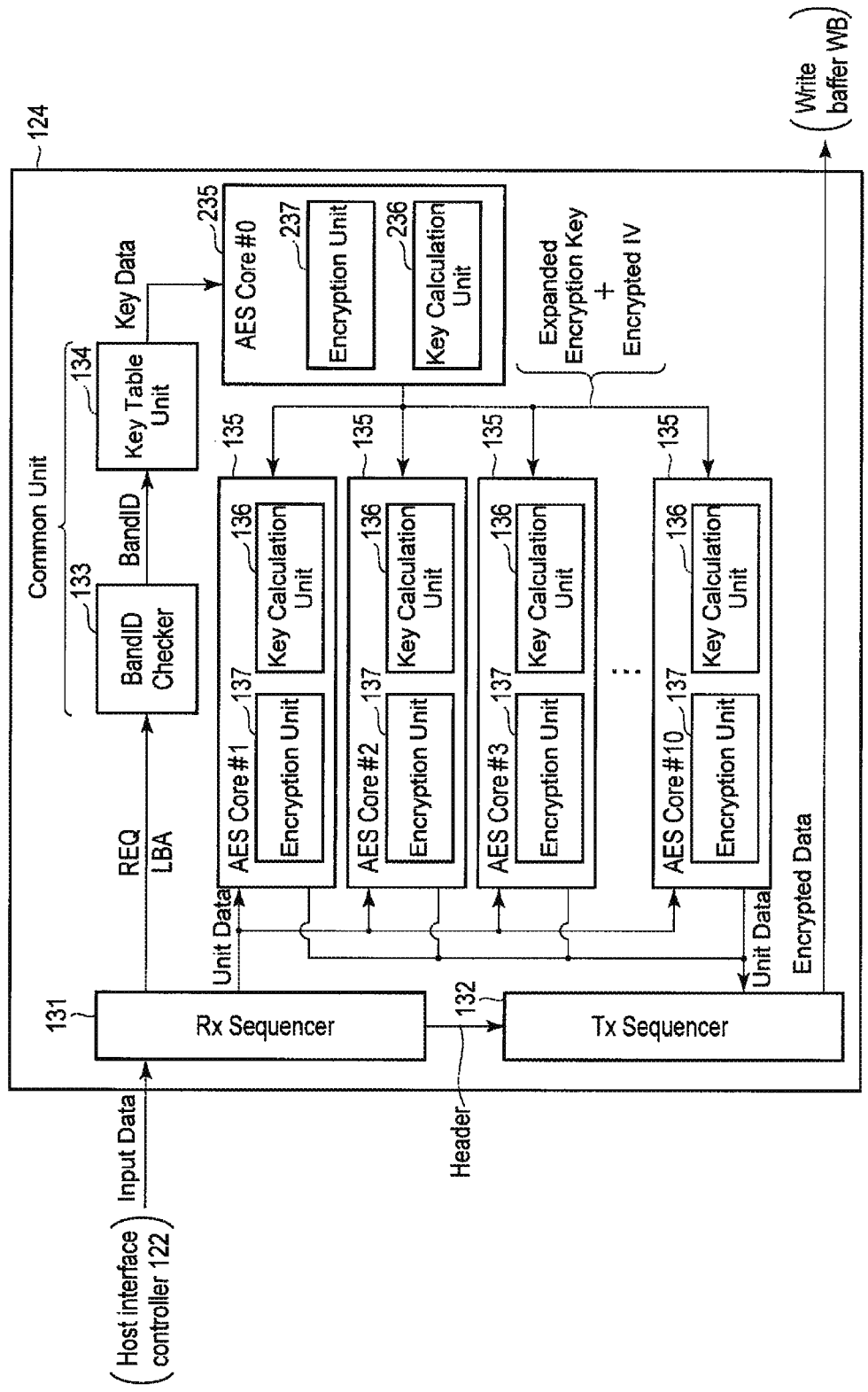
FIG. 9 is a block diagram showing an AES unit in a memory system according to a third embodiment.

As shown in FIG. 9, an AES unit 124 according to the third embodiment is different from those of the first and the second embodiments in that a dedicated core 235 (core #0) for performing S4 and S5 is further provided. Here, "dedicated" means that only S4 and S5 are performed for all items of unit data to be input, and no other processing is performed. Accordingly, the dedicated AES core 235 (core #0) comprises a key calculation unit 236 and an IV encryption unit 237 for performing S4 and S5 independently of the other AES cores (cores #1 to #10).

The key calculation unit 236 executes expansion of an encryption key (key data) input from a key table unit 134 (S4). The key calculation unit 236 inputs the expanded encryption key (an expansion key) to the IV encryption unit 237.

The IV encryption unit (dedicated core encryption unit) 237 uses the expansion key input from the key calculation unit 236 to encrypt an initialization vector (S5). The initialization vector is set in the IV encryption unit 237 in advance.

The AES core 235 transmits the expanded encryption key data and the encrypted IV data to each of the AES cores (cores #1 to #10), on the basis of a band ID.

Since the other structures are substantially the same as those of the first and the second embodiments, detailed descriptions of them are omitted.

[Data Transfer Operation]

Next, referring to FIG. 10, a data transfer operation of the AES unit 124 according to the third embodiment will be described.

Figure 10:
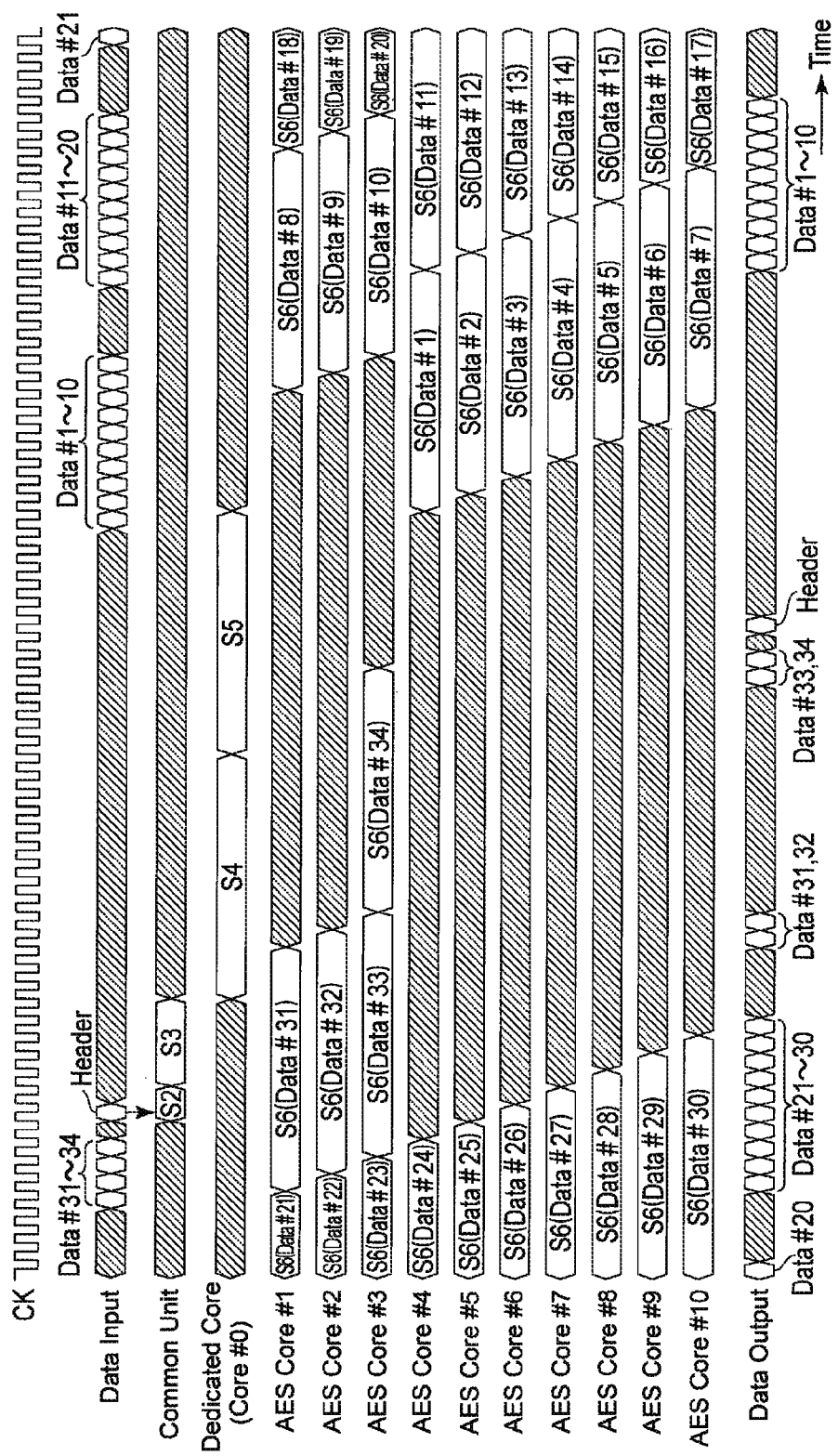
FIG. 10 is a timing chart of a data transfer operation carried out by the AES unit in the memory system according to the third embodiment.

As shown in FIG. 10, the data transfer operation according to the third embodiment is different from that of the second embodiment in that the dedicated core (core #0) for exclusively performing S4 and S5 is further added as shown in the fourth stream from the top in the figure. Accordingly, encryption (S6) of data #33 and #34 in AES core #3, and S4 and S5 in the dedicated core (core #0) can be executed temporally concurrently. As a result, it becomes possible to eliminate the need for waiting for the execution of S4 and S5.

[Effect and Advantage]

As described above, according to the structure and the operation of the AES unit 124 of the third embodiment, at least advantages similar to the above advantages (1) and (2) can be obtained.

Further, the AES unit 124 according to the third embodiment further comprises the dedicated AES core 235 (core #0) for performing S4 and S5.

Accordingly, the encryption (S6) of data #33 and #34 in AES core #3 and S4 and S5 in the dedicated core (core #0) can be executed concurrently (FIG. 10). As a result, the present embodiment is advantageous in that the need for waiting for the execution of S4 and S5 can be eliminated, the latency can be further reduced, and the communication speed can be more increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller for a memory system, the controller comprising:
   a host interface through which a write command and first write data associated with the write command are received; and
   an encryption unit configured to perform encryption of the first write data, the encryption unit including
      a buffer configured to store the first write data;
      a sequencer configured to read the first write data from the buffer and output the first write data as a plurality of sequential pieces of unit data;
      a plurality of first cores, each being configured to encrypt at least one of the pieces of unit data output from the sequencer;
      a checker configured to receive from the sequencer a request to search a key identification code for the first write data;
      a search unit configured to search for an encryption key corresponding to the key identification code; and
      a second core including a key expansion unit configured to expand the encryption key, and a core encryption unit configured to encrypt an initialization vector using the expanded encryption key and output the encrypted initialization vector to each of the first cores.

2. The controller according to claim 1, wherein one of the first cores encrypts both the last piece of unit data and the preceding piece of unit data.

3. The controller according to claim 1, wherein the buffer is further configured to output a header to the sequencer prior to outputting the first write data to the sequencer.

4. The controller according to claim 1, wherein the search unit stores correspondence between the key identification code and the encryption key.

5. The system controller according to claim 1, wherein each of the first cores encrypts the piece of unit data using the encrypted initialization vector output from the second core.

6. The controller according to claim 1, wherein the checker is further configured to receive from the sequencer a second request to search a second key identification code for second write data stored in the buffer after the first write data,
the search unit is further configured to search for a second encryption key corresponding to the second key identification code, and
the key expansion unit is further configured to expand the second encryption key while one of the first cores encrypts a piece of unit data.

7. The controller according to claim 1, wherein the sequencer is further configured to read second write data from the buffer after reading the first write data, and includes a counter configured to count the number of pieces of unit data in the write data read from the buffer, and calculate a sum of the number of pieces of unit data in the first write data and the number of pieces of unit data in the second write data.

8. The controller according to claim 1, wherein the sequencer is further configured to read second write data from the buffer, after reading the first write data, and output the second write data as a plurality of sequential pieces of unit data to the plurality of first cores, and
a first piece of unit data in the second write data is output to one of the first cores that is configured to receive a piece of unit data that is immediately subsequent to a piece of unit data received by another one of the cores that receives the last piece of unit data in the first write data.

9. The controller according to claim 1, further comprising:
   a second sequencer configured to receive the encrypted pieces of unit data from the plurality of first cores; and
   a writing unit configured to write the encrypted pieces of unit data in the nonvolatile memory.

10. An information processing system, comprising:
a host configured to transmit first write data;
a nonvolatile memory; and
a controller configured to receive the first write data from the host and write the first write data to the nonvolatile memory, wherein
the controller includes:
   a buffer configured to store the first write data;
   a sequencer configured to read the first write data from the buffer and output the first write data as a plurality of sequential pieces of unit data;
   a plurality of first cores, each being configured to encrypt at least one of the pieces of unit data output from the sequencer;
   a checker configured to receive from the sequencer a request to search a key identification code for the first write data;
   a search unit configured to search for an encryption key corresponding to the key identification code; and
   a second core including a key expansion unit configured to expand the encryption key, and a core encryption unit configured to encrypt an initialization vector using the expanded encryption key and output the encrypted initialization vector to each of the first cores.

11. The information processing system according to claim 10, wherein
one of the first cores encrypts both the last piece of unit data and the preceding piece of unit data.

12. The information processing system according to claim 10, wherein
the buffer is further configured to output a header to the sequencer prior to outputting the first write data.

13. The information processing system according to claim 10, wherein
the checker is further configured to receive from the sequencer a second request to search a second key identification code for second write data stored in the buffer after the first write data,
the search unit is further configured to search for a second encryption key corresponding to the second key identification code, and
the key expansion unit is further configured to expand the second encryption key while one of the first cores encrypts a piece of unit data.

14. The information processing system according to claim 10, wherein
the sequencer is further configured to read second write data from the buffer after reading the first write data, and includes a counter configured to count the number of pieces of unit data in the write data read from the buffer, and calculate a sum of the number of pieces of unit data in the first write data and the number of pieces of unit data in the second write data.

15. The information processing system according to claim 10, wherein
the sequencer is further configured to read second write data from the buffer, after receiving reading the first write data, and output the second write data as a plurality of sequential pieces of unit data to the plurality of first cores, and
a first piece of unit data in the second write data is output to one of the cores that is configured to receive a piece of unit data that is immediately subsequent to a piece of unit data received by another one of the cores that receives the last piece of unit data in the first write data.

* * * * *